(12) United States Patent
Obika et al.

(10) Patent No.: US 8,691,431 B2
(45) Date of Patent: Apr. 8, 2014

(54) METHOD OF PRODUCING SEALING STRUCTURE OF BIPOLAR BATTERY, METHOD OF MANUFACTURING BIPOLAR BATTERY, SEALING STRUCTURE OF BIPOLAR BATTERY, AND BIPOLAR BATTERY

(75) Inventors: Motoharu Obika, Yokohama (JP); Kenji Hosaka, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 163 days.

(21) Appl. No.: 13/395,944

(22) PCT Filed: Feb. 7, 2011

(86) PCT No.: PCT/JP2011/052540
§ 371 (c)(1),
(2), (4) Date: Mar. 14, 2012

(87) PCT Pub. No.: WO2011/122110
PCT Pub. Date: Oct. 6, 2011

(65) Prior Publication Data
US 2012/0171567 A1 Jul. 5, 2012

(30) Foreign Application Priority Data

Mar. 30, 2010 (JP) ................................. 2010-078740

(51) Int. Cl.
*H01M 2/08* (2006.01)
*H01M 2/16* (2006.01)
*H01M 10/18* (2006.01)

(52) U.S. Cl.
USPC .......... 429/185; 429/130; 429/210; 29/623.2; 29/623.4

(58) Field of Classification Search
None
See application file for complete search history.

(56) References Cited

U.S. PATENT DOCUMENTS

| 2004/0091771 A1* | 5/2004 | Hosaka et al. ................. 429/185 |
| 2008/0220330 A1 | 9/2008 | Hosaka et al. |
| 2009/0233164 A1* | 9/2009 | Shimamura et al. .......... 429/149 |

FOREIGN PATENT DOCUMENTS

| EP | 2116360 | * 11/2009 |
| JP | 2004-158343 A | 6/2004 |
| JP | 2004-319156 A | 11/2004 |
| JP | 2006-190649 A | 7/2006 |
| JP | 2007-122881 A | 5/2007 |
| JP | 2008-97940 A | 4/2008 |
| JP | 2010-67581 A | 3/2010 |

* cited by examiner

*Primary Examiner* — Ula C Ruddock
*Assistant Examiner* — Matthew Van Oudenaren
(74) *Attorney, Agent, or Firm* — Foley & Lardner LLP (57) ABSTRACT

The present invention is intended to provide a method of producing a sealing structure of a bipolar battery capable of improving the sealing capability by means of solidifying the joint between a resin collector comprising a thermosetting resin before the setting reaction and a sealing layer, a method of producing the bipolar battery, and the sealing structure of the bipolar battery and the bipolar battery. The method of producing the sealing structure of the bipolar battery comprises s step of producing the sealing assembly 80 by joining the first sealing layer 81 consisting of thermosetting resin before the thermosetting reaction with the second sealing layer 82 consisting of the thermoplastic resin, and a step of producing the collector assembly 90 formed by sealing the contact area of the sealing assembly and the resin collector 60 by joining the sealing assembly with the thermosetting resin after the thermosetting reaction.

6 Claims, 7 Drawing Sheets

METHOD OF PRODUCING SEALING STRUCTURE OF BIPOLAR BATTERY, METHOD OF MANUFACTURING BIPOLAR BATTERY, SEALING STRUCTURE OF BIPOLAR BATTERY, AND BIPOLAR BATTERY

TECHNICAL FIELD

The present invention relates to a method of producing a sealing structure of a bipolar battery, a method of producing a bipolar battery, a sealing structure of a bipolar battery, and a bipolar battery.

BACKGROUND TECHNOLOGY

Against a backdrop of rising demands of environment protectionism, the development of electric vehicles (EV), hybrid electric vehicles (HEV), and fuel cell vehicles (FCV) has been flourishing in recent years. What is attracting the attention of the market as a potential power source for driving the motors used on those vehicles is the rechargeable bipolar battery.

The electrode of the bipolar battery consists of a negative electrode formed on one side and a positive electrode formed on the other side of the collector. The collector is provided with a sealing part that prevents the leakage and evaporation of the electrolyte that is caused to permeate into the positive and negative electrodes. The sealing part is formed by overlaying the collector with a hot-melt type sealing layer comprising a plastic material and adhering them together by applying heat.

The collector used on the bipolar battery is composed of a material selected from various materials from the standpoint of improving the performance of the bipolar battery. A collector composed of a polymer material in lieu of a conventional metal foil has been proposed in order to obtain a lightweight collector (see Patent Document 1). Patent Document 1 discloses the use of a thermosetting resin as such a polymer material. In the disclosure, the sealing part is formed by using a hot-melt type thermoplastic resin as the sealing layer and adhering it to the collector by means of a hot press.

PRIOR ART DOCUMENTS

Patent Document

Publication of Japanese Patent Application 2006-190649.

DISCLOSURE OF INVENTION

Problems to be Solved by the Invention

The sealing method using a thermoplastic resin is executed by causing a heated polymer material (resin) to fuse with a polymer material of the sealing part of the collector and to solidify it by cooling it. In forming the sealing part by adhering the polymers, the sealing characteristics are substantially affected by the SP value (solubility parameter) that indicates the ease of mixing of the materials in the adhering part.

The SP value is a physical property of the affinity of materials. Materials that have close SP values are likely to mix with each other easily and those that have distant SP values are not likely to mix with each other easily. The materials that are likely to mix with each other easily produce a more solid adhesion when they are hardened and provide a higher adhering.

Generally speaking, the SP values of a thermosetting resin and a thermoplastic resin are wider apart with each other compared to those between the two thermosetting resins. A collector comprising a thermosetting resin and a sealing layer made of a thermoplastic resin do not easily mix with each other and result in a poor adhering force.

If a conventional hot-melt type sealing layer consisting of a thermoplastic resin is used, a poor adhering force results between it and a collector comprising a thermosetting resin. This poor adhering force in turn causes a poor sealing characteristic of the sealing part, resulting in a poor cycling characteristic of the bipolar battery due to the leakage and evaporation of the electrolyte.

The present invention is made to solve the abovementioned problems concerning the sealing structure of bipolar batteries, and is intended to provide a method of producing a sealing structure of a bipolar battery that improves the sealing capability by means of solidifying the adhering between the resin collector including a thermosetting resin after the setting reaction and sealing layer, a method of producing a bipolar battery, a sealing structure of a bipolar battery and a bipolar battery each produced by these methods.

Means for Solving Problems

The method of producing the sealing structure of the bipolar battery according to the present embodiment includes a step of at least stacking a first sealing layer comprising a thermosetting resin and a second sealing layer comprising a thermoplastic resin that is not cured. Moreover, it includes a step of preparing a sealing assembly by heating the first sealing layer and the second sealing layer at a temperature lower than the temperature that the thermosetting resin of the first sealing layer is cured in order to adhere the first sealing layer to the second sealing layer together. It further includes a step of stacking the first sealing layer of the sealing assembly on the same surface that an electrode is formed of the peripheral part of a resin collector comprising the thermosetting resin that is cured. Finally, it includes a step of producing a collector assembly in which it is sealed between the sealing assembly and the resin collector by means of heating the sealing assembly and the resin collector at a temperature that the thermosetting resin of the first sealing layer is cured.

Effect of the Invention

In the present invention, in the step of producing the sealing assembly, the adhering between the first sealing layer and the second sealing layer is executed by heating at a temperature lower than the temperature that the thermosetting resin of the first sealing layer is cured. As a result, in the step of adhering the sealing assembly to the resin collector, the adhering step can be accomplished by causing the first sealing layer to be cured. As a consequence, it is possible to improve the sealing capability of the bipolar battery by making the adhesion between the resin collector and the sealing assembly more solid.

WORKING CONFIGURATION OF THE INVENTION

First, let us describe the overall structure of a lithium ion secondary battery, which is a preferable embodiment of the present invention. Bipolar batteries, except the one that is to be described especially herein, can be produced in the publicly known form of general lithium ion secondary batteries, and are not limited to the form described herein. In describing the drawings, identical elements will be identified by identical codes in order to avoid duplicating descriptions. Also, the scaling factors of the drawings may vary from those of the actual components because of intentional exaggerations for the sake of explanations.

Figure 1:
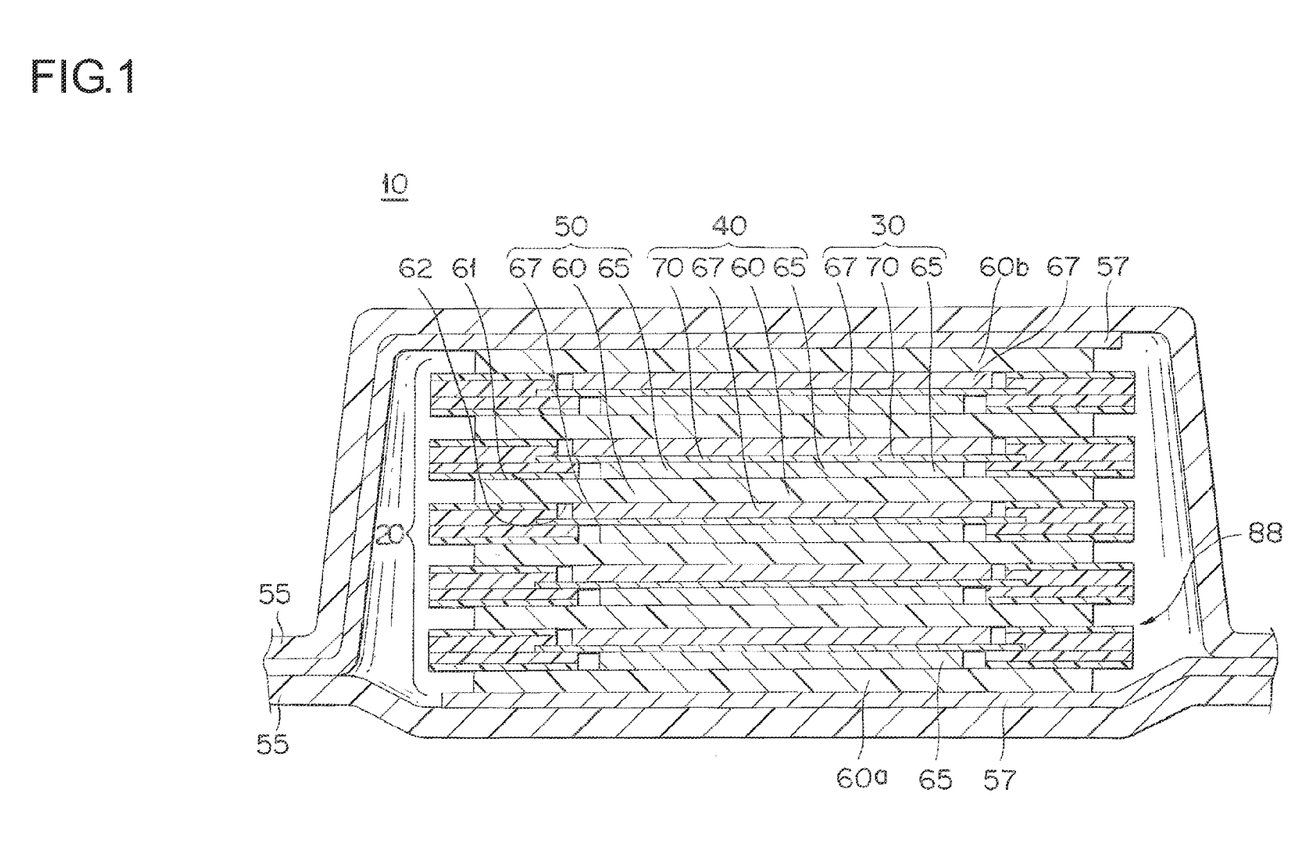
FIG. 1 is a schematic cross-sectional view of the entire bipolar battery according to the present embodiment.

In reference to FIG. 1, a bipolar battery 10 is formed by having a substantially rectangular shaped power generating element where charge-discharge reactions occur sealed inside of a laminating sheet 55, which is an external packaging material.

The power generating element 20 comprises a plurality of laminated bodies 40 stacked together. Each laminated body 40 comprises a bipolar electrode 50 formed with a positive electrode 65 on a first side 61 (corresponds to the aforementioned "one side") of a resin collector 60 and a negative electrode 67 on a second side 62 (corresponds to the aforementioned "the other side"), and an electrolyte layer containing an electrolyte that permeates into the positive electrode 65 and the negative electrode 67. The electrolyte layer is formed to hold the electrolyte in the central part of the surface direction of a separator 70, which functions as a substrate.

The positive electrode 65, the electrolyte layer, and the negative electrode 67 adjoining with each other constitute a single electrical cell layer 30. Thus, the bipolar battery 10 comprises the configuration of a plurality of laminated simple electrical cell layers 30. Only the positive electrode 65 is formed on a resin collector 60a located on the outermost layer on the positive electrode side in the power generating element 20. On the other hand, only the negative electrode 67 is formed on a resin collector 60b located on the outermost layer on the negative electrode side in the power generating element 20. It is possible to form the positive electrode 65 on the first and second side 61 and 62 of the resin collector 60a located on the outermost layer as well. Similarly, it is possible to form the negative electrode 67 on the first and second side 61 and 62 of the resin collector 60b located on the outermost layer as well.

Collector plates 57 consisting of a material of high electrical conductivity are connected to the resin collectors 60a and 60b located on the outermost layers of the power generating element 20. Although it is not shown in the diagram, a portion of each of the collector plates 57 extends to the outside of the laminating sheet 55, which is the external packaging material. This is so that they can be used as electrode tabs for drawing the electric current to the outside from the power generating element 20.

A sealing part 88 is formed in order to prevent the leakage and evaporation of the electrolyte from the electrolyte layer. The sealing part 88 serves to prevent the leakage and evaporation of the electrolyte and to prevent the cycling characteristics of the bipolar battery 10 from deterioration. It also provides a function of preventing liquid junction between the adjoining resin collectors 60 as well as a function of preventing infiltration of, e.g., water, from the outside to the inside of the battery.

Figure 5A:
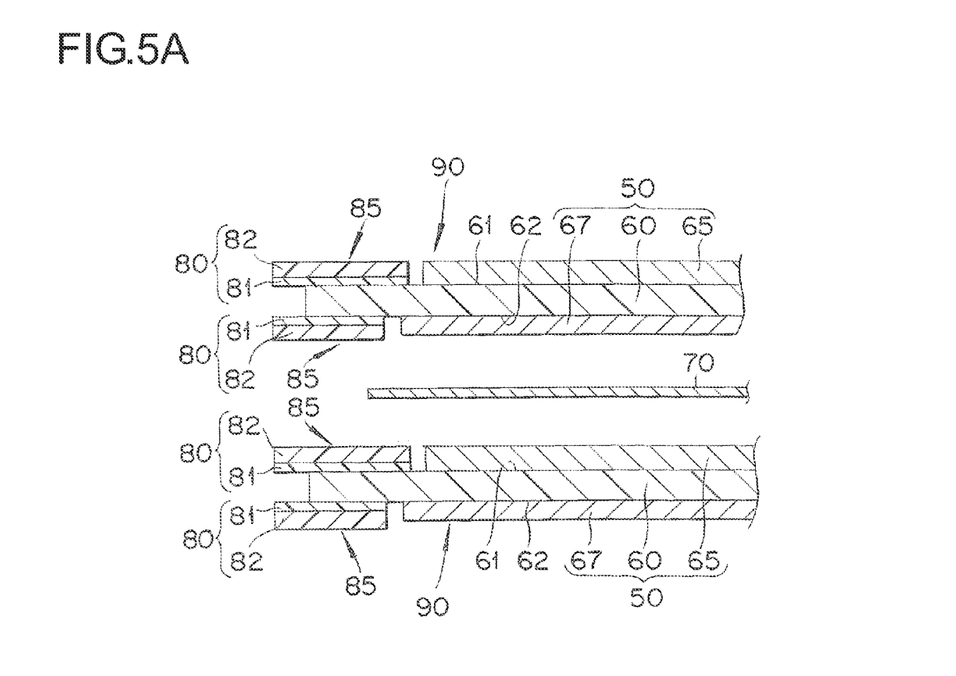
FIG. 5A is a schematic cross-sectional view for describing the step 15 of the present embodiment.
Figure 5B:
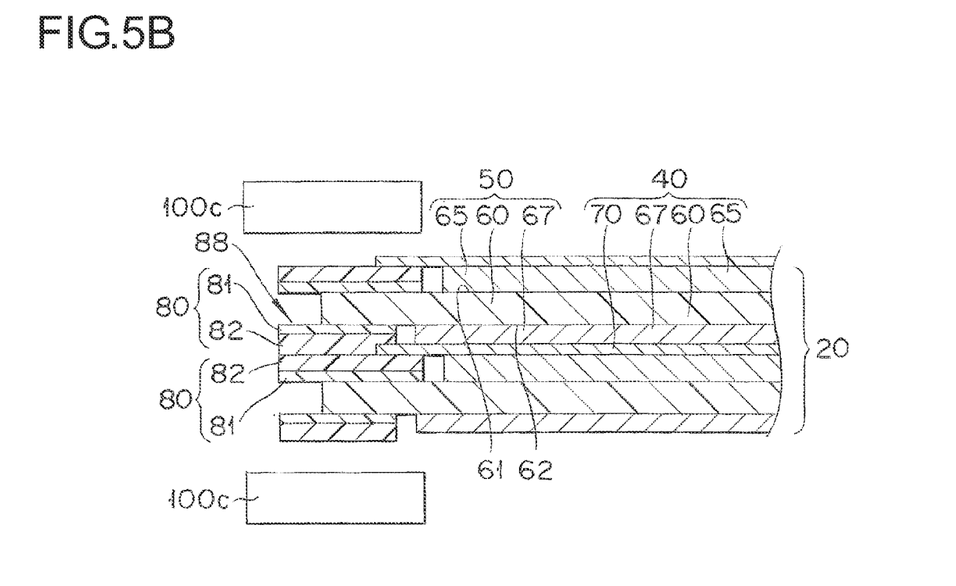
FIG. 5B is a schematic cross-sectional view for describing the steps 16 and 17 of the present embodiment.

FIGS. 5A and 5B show enlarged cross-sectional view of portions of the bipolar battery 10. The bipolar battery 10 comprises the resin collector 60 containing a thermosetting resin, and a sealing assembly 80 formed by adhering a first sealing layer 81 consisting of a thermosetting resin to a second sealing layer 82 consisting of a thermoplastic resin. A contact area of the sealing assembly 80 and the resin collector 60 is sealed by adhering the first sealing layer 81 of the sealing assembly 80 to the resin collector 60. The sealing assembly 80 is adhered via the first sealing layer 81 to the first side 61 on which the positive electrode 65 is formed as well as to the second side 62 on which the negative electrode 67 is formed in the resin collector 60. The bipolar battery 10 comprises the laminated bodies 40, in each of which a porous separator 70, the electrolyte permeates into, is laid on the resin collector 60, and the power generating element 20 comprising a plurality of laminated bodies 40 stacked together in such a manner that the second sealing layers 82 face with each other. The second sealing layers 82 are fused together to seal between the sealing assemblies 80.

Individual sealing assemblies 80 that are adhered to the resin collector 60 constitute a sealing structure 85 that forms the sealing part 88. The sealing part 88 is formed by sealing between the two adjoining sealing assemblies 80 that are adhered to the resin collector 60 with the second sealing layer 82.

Next, let us describe the constituent elements of the bipolar battery.

[Resin Collector]

The resin collector 60 comprises a resin layer having electrical conductivity. The resin collector 60 preferably consists of a resin layer having electrical conductivity. The resin layer has electrical conductivity, necessarily contains a thermosetting resin, and serves as a collector. As the thermosetting resin, it is preferable to use a thermosetting resin of the polyimide group, but it is not limited to it, but rather other thermosetting resins, e.g., phenolic resin, melamine resin, polyester resin, epoxy resin, etc., can be used as well. For example, the resin layer can be formed by mixing those thermosetting resins at a specified ratio and hardening the mixture. Let us now describe the specific structure of the resin collector 60.

The specific forms for the resin layer to have electrical conductivity can be: (1) a form where the polymer materials comprising the resin themselves are electrically conductive, and (2) a form where the resin layer comprises a resin and an electrically conductive filler (electrically conductive material).

The conductive polymers in the above form (1) are selected from materials that have electrical conductivity, but are not conductive concerning the ions that are used as electrical charge transporting media. These electrically conductive polymers are considered to provide conductivity as the conjugating polyene groups form an energy band. A typical case is a polyene group electrically conductive polymer that is widely being used in electrolytic capacitors. Specifically, polyaniline, polypyrrole, polythiophene, polyacetylene, polyparaphenylene, polyphenylene vinylene, polyacrylonitrile, polyoxadiazole, or their mixtures are preferable. From the standpoint of electrical conductivity and stable usability in a battery, polyaniline, polypyrrole, polythiophene, and polyacetylene are more preferable.

The electrically conductive filler (electrically conductive material) to be used in the 2) form above can be selected from electrically conductive materials. They should preferably material that are not conductive concerning the ions that are used as electrical charge transporting media, from the standpoint of limiting the ion transmission through the resin layer with electrical conductivity.

More specifically, suitable materials are aluminum, stainless steel, carbon, silver, gold, copper and titanium, but are not limited to them. These electrically conductive fillers can be used singly or as a mixture of two or more kinds. Moreover, alloys of them can be used as well. Silver, gold, aluminum, stainless steel, and carbon are suitable, but carbon is more suitable. These electrically conductive fillers (electrically conductive materials) can be powdery ceramic materials and resin materials coated with an electrically conductive material (one of those electrically conductive materials mentioned above) by the plating process.

the carbon material above can be at least a material selected from the group consisting of acetylene black, vulcan, black pearl, carbon nanofiber, ketchen black, carbon nanotube, carbon nanohorns, carbon nanobaloon, hard carbon, and fullerene. These carbon materials has a wide window of electric potential, stable for a wide range for both positive and negative electrical potentials, and has an excellent electrical conductivity. Moreover, since a carbon material is extremely light-weighted, the increase of mass can be held minimum. Moreover, since carbon materials are often used as conductivity assisting materials of electrodes, the contact resistance can be held minimum when they contact with those conductivity assisting materials as they are the same materials. If a carbon material is used as electrically conductive particles, it is possible to lower the conformability of the electrolyte by applying the hydrophobic treatment on the surface of carbon in order to create a condition which makes it difficult for the electrolyte from seeping into the holes of the collector.

The shape of the electrically conductive filler (electrically conductive material) is not limited in particular, and can be either grain, powder, fiber, plate, nuggets, cloth or mesh-like shapes, or any other shape publicly known. For example, it is preferable to use a grainy shaped electrically conductive material if it is desired to provide electrical conductivity to the resin for a wide range. On the other hand, if it is desired to provide electrical conductivity in a particular direction of the resin, it is preferable to use an electrically conductive material having a certain directionality because of its shape such as fibers.

Also, if it is a case where the resin layer contains an electrically conductive filler, the resin that forms the resin layer can contain a polymer material with no electrical conductivity that binds the particular electrically conductive filler in addition to the electrically conductive filler mentioned above. By using a polymer material with no electrical conductivity as the constituent material of the resin layer, it is possible to increase the adhesiveness of the electrically conductive filler and hence the reliability of the battery. The polymer material can be selected from the materials that can withstand the positive and negative electric potentials to be applied.

The preferable examples of polymer materials with no electrical conductivity include polyethylene (PE), polypropylene (PP), polystyrene (PS), polyethylene terephthalate (PET), polyether nitrile (PEN), polyimide (PI), polyamide (PA), polyamideimide (PAI), polytetrafluoroethylene (PTFE), styrene-butadiene rubber (SBR), plolyacrylonitrile (PAN), polymethyl acrylate (PMA), polymethacrylate (PMMA), polyvinyl chloride (PVC), poly vinylidene fluoride (PVdF), and their mixtures. These materials have wide windows of electric potential and are stable at either positive or negative electric potentials. They are also light-weighted so that it is possible to form a battery of a high output density. Among these, polyimides are the most preferable.

The electrically conductive filler has no particular restriction for the content either. In particular, there is no need to add an electrically conductive filler to the resin if the resin contains an electrically conductive polymer material and a sufficient level of electrical conductivity can be maintained. However, if the resin consists only of non-electrically conductive polymer materials, it is necessary to add an electrically conductive filler in order to provide an appropriate electrical conductivity. The content of the electrically conductive filler in such a case should be preferably 5-35 wt % relative to the total mass of the non-electrically conductive polymers, or more preferably 5-25 wt %, or further preferably 5-15 wt %. By adding such an amount of electrically conductive filler, it is possible to provide a sufficient level of electrical conductivity to a non-electrically conductive material while limiting the mass increase of the resin.

While the resin layer mentioned above can contain additives other than an electrically conductive filler and a resin, it is preferable to be consisting of the electrically conductive filler and the resin.

The resin layer can be produced based on a publicly known method. For example, it can be produced by means of the spray method or the coating method. More specifically, it can be produced by preparing a slurry containing a polymer material, applying it, and making it to harden. As to the specific form of the polymer material to be used for preparing the slurry, it is essentially how it is described in the above, so that further description is omitted here. Other component that can be included in the abovementioned slurry is an electrically conductive filler. As to the specific example of the electrically conductive filler, they are as described in the above so that further description is omitted here. An appropriate filler can be obtained also by mixing a polymer material, an electrically conductive filler, or any other additives by a publicly known method, and forming the obtained mixture into a film. The resin layer can be made also by means of the ink jet method as disclosed in the Publication of Japanese Patent Application No. 2006-190649. A resin film having electrical conductivity available on the market can be used for this purpose as well. Examples of such electrically conductive thermosetting polyimide films available on the market include: Upilex (registered trademark)-S 50S of Ube Industries, Ltd., Apical (registered trademark) of Kaneka Corporation, and Kapton (registered trademark) of Du Pont-Toray Co., Ltd.

For example, a resin collector whose resin layer is a thermosetting polyimide can be produced by using polyamic acid as a precursor of the resin layer with the following method. In other words, it is a method of preparing a solution by mixing polyamic acid with an electrically conductive material, applying it on a flat support body, drying it by heating to forma film, and polymerizing the precursor by heat treatment to form a collector.

The heating means in preparing a film of polyamic acid is not particularly limited, rather it can be selected from any publicly known means such as a hot air dryer, a hot nitrogen dryer, a far-infrared dryer, a high frequency induction heading device, and the like. The heating time is also not particularly limited, but it should preferably be 5-180 minutes, or more preferably 10-120 minutes. Moreover, the heating temperature is also not particularly limited, but it should preferably be 70-150° C., or more preferably 80-120° C.

The heat treatment for converting the polyamic film into a polyimide film should preferably done in two steps. The first heat treatment should be done at 100-250° C. for 1-10 minutes, and the second heat treatment should be done at 400-600° C. for 0.1-15 minutes. The temperature rising slope from the end the first heat treatment to the beginning of the second heat treatment should preferably be 1-15° C./sec. In general, heat treating a polyamic acid film at a temperature higher than the aforementioned drying temperature promotes the imidization reaction to produce a polyimide film.

The thickness of the resin collector 60 is not particularly limited, but it should be as thin as possible from the standpoint of heightening the output density of the battery. In case of the bipolar battery 10, it is acceptable for the resin collector 60 existing between the positive electrode 65 and the negative electrode 67 to have a high electrical resistance in the direction horizontal to the lamination direction, so that it is possible to make the thickness of the resin collector 60 to be thin. Specifically, the thickness of the resin collector 60 should preferably be 0.1-150 µm, or more preferably 10-100 µm. The particular resin collector 60 can be of a single layer structure, or a multiple layer structure of two or more layers.

[Positive Electrode]

The positive electrode active substance of the positive electrode 65 is, for example, lithium-manganese compound oxides such as $LiMn_2O_4$, lithium-nickel compound oxides such as $LiNiO_2$, or lithium-cobalt compound oxides such as $LiCoO_2$, etc. However, the present invention is not limited to them. From the standpoint of the capacitance and the output characteristics, it is preferable touse lithium-transitory metal compound oxides.

[Negative Electrode]

The negative electrode active substance of the negative electrode 67 is, for example, hard carbon (Hardly graphitized carbon material). However, it is possible to use graphitic carbon materials and lithium-transitory metal compound oxides without being limited to them. Negative electrode active materials consisting of carbon and lithium-transitory metal compound oxides are especially preferable from the standpoint of the capacitance and output characteristics.

[Electrolyte Layer]

The raw material of the separator 70, which is a part of the electrolyte layer is, for example, porous polyethylene resin (PE) that has permeability to allow the electrolyte to permeate into. However, it is not limited to it, but rather, polypropylene resin (PP), polyolefin resin, a laminated substance having a triple layer of PP/PE/PF, polyamide, polyimide, aramid, and unwoven fabrics can be used as well. The unwoven fabrics can be made of cotton, rayon, acetate, nylon, polyester, etc. The diameter of micropores of the separator 70 should preferably less than 1 µm (normally less than several tens of nanometers).

The host polymer of the electrolyte is typically VDF-HFP (copolymer of poly vinylidene fluoride and hexafluoro propylene) containing 10% of HFP (hexafluoropropylene)polymer. However, it is not limited to it, but rather it is also possible to use other polymers having no lithium ion conductivity or polymers with ion conductivity (solid polymer electrolyte). The other polymers having no lithium ion conductivity are, for example, polyacrylonitrile and polymethylmethacrylate. The polymers having ion conductivity are, for example, polyethylene oxide and polypropylene oxide.

The electrolyte to be retained by the host polymer contains, for example, organic solvent consisting of propylene carbonate (PC) and ethylene carbonate (EC), and lithium salt ($LiPF_6$) as the supporting salt. The organic solvents here are not limited to polypropylene carbonate and ethylene carbonate, but rather, other cyclic carbonates, chain-like carbonates such as dimethyl carbonate, ethers such as tetrahydrofuran, and the like can be used as well. Applicable lithium salts are not limited to $LiPF_6$, but rather other inorganic negative ion salts and organic acid negative ion salts such as $LiCF_3SO_3$ can be used as well.

[External Packaging Material]

Laminating sheet 55, for example, can be used as the external packaging material. Laminating sheet 55 that can be used here is composed as those having a triple layer structure consisting of laminated polypropylene resin (PP), aluminum, and nylon in this order. In certain cases, any publicly known metal can be used as the external packaging material

[Collecting Plate]

For the collector plate 57 consisting of highly electrically conductive materials, aluminum, copper, titanium, nickel, stainless steel as well as their alloys can be used.

[Sealing Part]

The sealing part 88 is formed using the sealing assembly 80 having a two-layer structure consisting of the first sealing layer 81 and the second sealing layer 82.

A thermosetting resin is used for the first sealing layer 81. For example, it can be chosen arbitrarily from various thermosetting resins such as polyimide, phenolic resin, melamine resin, polyester resin, and epoxy resin, as well as their mixtures.

A publicly known, hot-metal type thermoplastic resin is used for the second sealing layer 82. For example, polyester resins such as polyethylene resin (PE), polypropylene resin (PP), polyethylene terephthalate (PET), polybutyleneterephthalate (PBT), polytrimethylene terephthalate (PTT), polyethylene naphthalate (PEN), andpolybutylenenaphthalate (PBN) can be used for this purpose. From the viewpoints of corrosion resistance, chemical resistance, ease of producing (ease of film-forming), and economy, polyethylene resin, polypropylene resin, polyethylene terephthalate, polybutylene terephthalate, and polyethylene naphthalate are preferably uses as the second sealing layer 82. The second sealing layer 82 can be used alone or mixed with other materials.

Figure 3A:
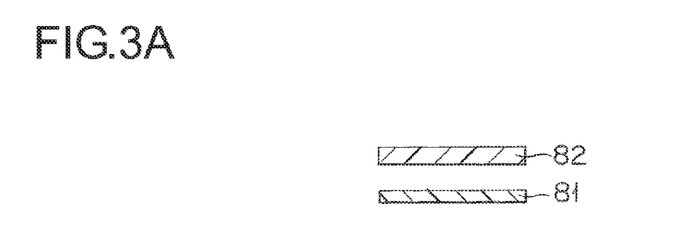
FIG. 3A is a schematic cross-sectional view for describing the step 11 of the present embodiment.
Figure 3B:
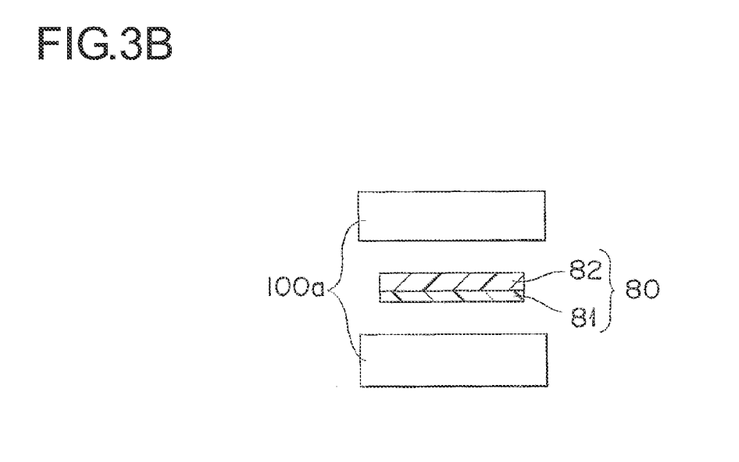
FIG. 3B is a schematic cross-sectional view for describing the step 12 of the present embodiment.

As shown in FIGS. 3A and 3B, the sealing assembly 80 is produced by adhering the first sealing layer 81 to the second sealing layer 82.

Prior to the adhering of the sealing layer to the resin collector 60, the sealing assembly 80 is produced by temporarily adhering the first sealing layer 81 to the second sealing layer 82. In producing the sealing assembly 80, a thermosetting resin that is not cured is prepared as the first sealing layer 81.

The adhering of the first sealing layer 81 to the second sealing layer 82 is conducted by softening the first sealing layer 81 and the second sealing layer 82 by heating them with the hot press 100*a*. The hot press 100*a* is not limited to a particular design, rather any such machine used for thermally binding resin materials can be arbitrarily used. Same thing goes with the hot presses 100b and 100c to be described later.

The softened first sealing layers 81 and the softened second sealing layers 82 physically make a close contact with each other. In this close contact state, the second sealing layer 82 consisting of a thermoplastic resin is cooled to be solidified. As the second sealing layer 82 solidifies, the first sealing layer 81 and the second sealing layer 82 adhere together.

The heating condition is set in such a temperature and time that the first sealing layer 81 is cured several percentages. This is to prevent the first sealing layer 81 from being cured excessively. This makes it possible that the first sealing layer 81 is cured sufficiently in the step of adhering the first sealing layer 81 to the resin collector 60 to be performed later (see FIG. 4B).

The degree of progress of how much the first sealing layer 81 is cured in the step of producing the sealing assembly 80 needs not to be particularly limited but rather is sufficient simply to be controlled within the range of enabling the adhering using the curing reaction in the step of adhering the first sealing layer 81 to the resin collector 60.

The thickness of the sealing assembly 80 should preferably be 5-200 μm, or more preferably 10-150 μm but it is not limited to it.

Figure 4A:
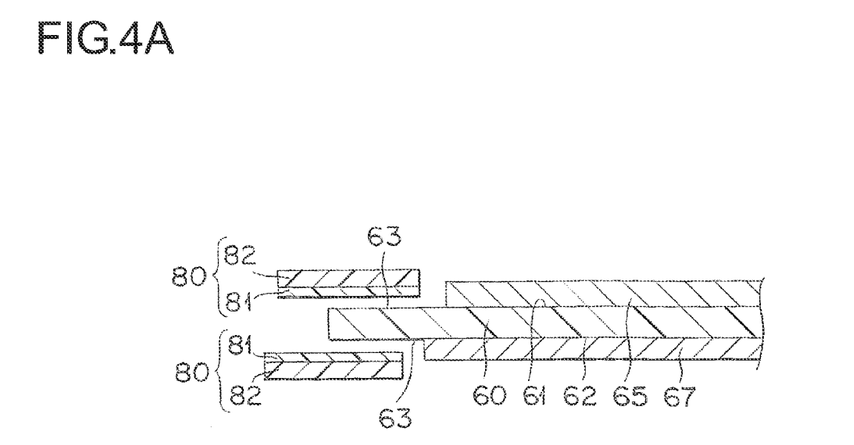
FIG. 4A is a schematic cross-sectional view for describing the step 13 of the present embodiment.
Figure 4B:
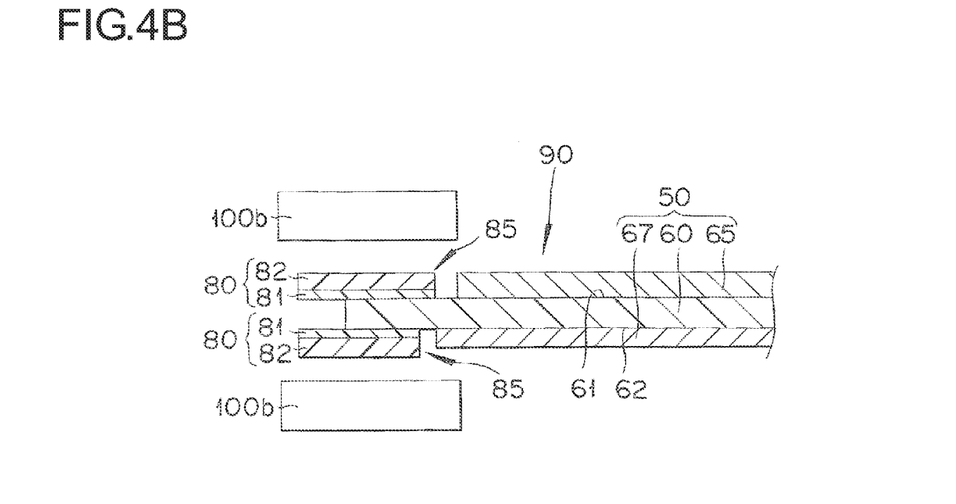
FIG. 4B is a schematic cross-sectional view for describing the step 14 of the present embodiment.

As is shown in FIGS. 4A and 4B, the collector assembly 90 is produced by adhering the sealing assembly 80 to the resin collector 60 prior to the formation of the sealing part 88.

The manufacture of the collector assembly 90 is conducted by causing the first sealing layer 81 to be cured after overlaying the sealing assembly 80 on the resin collector 60 in such a manner as to cause the first sealing layer 81 to face it. The heating condition is adjusted in the aforementioned step of producing the sealing assembly 80 in order to prevent the first sealing layer 81 from being cured excessively. Thus it is possible to cause the first sealing layer 81 to be cured sufficiently.

While the sealing part 80 is in a condition of being overlaid on the peripheral part 63 of the first side 61 where the positive electrode 65 is formed on the resin collector 60, as well as on the peripheral part 63 of the second side 62 where the negative electrode 67 is formed, the sealing assembly 80 and the resin collector 60 are heated and adhered together by the hot press 100b. The heating condition here is set in such a temperature and time that the first sealing layer 81 is cured sufficiently.

The resin collector 60 contains the thermosetting resin that is cured as a constituent material. The thermosetting resin does not soften when it is reheated as it becomes insoluble and infusible even as it hardened by the bridging reaction between molecules by the heat. Consequently, it is difficult to adhere the resin collector 60 to the first sealing layer 81 by softening them under a physically close contact condition. Therefore, in the present embodiment, the adhering is made by the method of using the progress of the first sealing layer 81 to be cured consisting of a thermosetting resin, taking advantage of the fact that there is only a small difference between the SP values of thermosetting resins.

In forming the sealing part by adhering the polymers, the sealing characteristics are substantially affected by the SP value that indicates the ease of mixing of the materials in the adhering part. The SP value is a physical property of the affinity of materials. Materials that have close SP values are likely to mix with each other easily and those that have distant SP values are not likely to mix with each other easily. Generally speaking, the thermosetting resins can be mixed and making solid adhesion easily because the SP values' differences between them are small. In contrast, the difference of SP values between a thermosetting resin and a thermoplastic resin is large so that they are difficult to be mixed and a weak adhering force results. This invites degradation of the sealing capability of the sealing part.

The first sealing layer 81 prior to the hardening overlaid on the resin collector 60 softens during the process of being cured. Therefore, the first sealing layer 81, which is made of a polymer material, can be fused together with the resin collector 60, which is made of a polymer material. Since the difference between the SP values of the first sealing layer 81 made of a polymer material and of a thermosetting resin contained in the resin collector 60 is small, the first sealing layer 81 becomes easily mixable with the resin collector 60. As the two materials are well mixed, the temperature is raised to promote the first sealing layer 81 to be cured. As the first sealing layer 81 is cured sufficiently, the resin collector 60 and the first sealing layer 81 solidly adhere together. Thus, the collector assembly 90 is produced as the contact area of the sealing assembly 80 and the resin collector 60 is sealed by adhering the first sealing layer 81 to the resin collector 60.

The sealing assembly 80 is adhered to the first side 61 that forms the positive electrode 65 of the resin collector 60 as well as with the second side 62 that forms the negative electrode 67.

The sealing assembly 80 is adhered to the first side 61 of the resin collector 60 and the second side 62 of the resin collector 60 simultaneously in one heating operating. This contributes to the reduction of the bipolar battery producing steps compared to a case of adhering the sealing assembly 80 with the first side 61 of the resin collector 60 and the second side 62 of the resin collector 60 independently. Moreover, in forming the laminated body 40 by stacking the resin collector 60 with the separator 70, it is possible to handle the sealing assembly 80 and the resin collector 60 together as an integrated collector assembly 90. This makes it possible to simplify the process of producing the bipolar battery compared to a case of preparing the sealing layer and the collector separately and stacking them.

As is shown in FIGS. 5A and 5B, the sealing part 88 is formed when the second sealing layers 82 are together after stacking a plurality of the laminated bodies 40 formed by stacking the separator 70 that serves as the substrate of the electrolyte layer and the collector assembly 90.

The laminated bodies 40 are stacked in such a manner that the second sealing layers 82 of the sealing assemblies 80 face with each other. In case gel electrolyte or liquid electrolyte is used as the electrolyte, the stacking is conducted in such a manner that the peripheral part of the separator 70 is sandwiched by the second sealing layers 82. The leakage of the electrolyte and liquid junction between the resin collectors 60 can be effectively prevented by sandwiching the peripheral part of the separator 70. If solid polymer electrolyte is to be used as the electrolyte here, there is no need for stacking the peripheral part of the separator 70 by the second sealing layer 82, and the stacking can be done without sandwiching the peripheral part of the separator 70.

The hot press 100c heats the second sealing layers 82 while they are placed facing with each other in order to cause the second sealing layers 82 to melt to fuse with each other. As the fused second sealing layers 82 get cooled to solidify, the contact area of the adjoining sealing assemblies 80 is sealed. The sealing part 88 is formed as such. The heating condition in forming the sealing part 88 is set in such a manner that the temperature is higher than the melting point of the second sealing layer 82, which is the thermosetting resin, and the heating time is sufficient to cause fusing. The sealing part 88 formed by fusing the second sealing layers 82 effectively prevents the leakage and evaporation of the electrolyte that is caused to permeate into the positive electrode 65 and the negative electrode 67, as well as infiltration of water and such from the outside.

The sealing part 88 is formed using the sealing assembly 80 having a two-layer structure consisting of the first sealing layer 81 and the second sealing layer 82. Therefore, it is possible not only to increase the adhering force between the sealing assembly 80 and the resin collector 60 by means of the first sealing layer 81 (first layer) consisting of thermosetting resin, but also to provide the sealing part 88 with a degassing function by the second sealing layer 82 (second layer) consisting of thermoplastic resin. Since the second sealing layer 82 is made of thermosetting resin, it is possible to break the adhering between the second sealing layers 82 after fusing them together and adhering them again. When gas is generated inside the bipolar battery 10 during the producing process or during the charging and discharging process of the bipolar battery 10, the second sealing layer 82 can be cut to remove the gas in order to prevent the performance degradation due to the remaining gas.

Expansion and contraction of the resin collector 60 can occur during the charging and discharging of the bipolar battery 10. The second sealing layer 82 made of thermoplastic resin can expand more easily than the first sealing layer 81 made of thermosetting resin. During the expansion and contraction of the resin collector 60, the flexible deformations of the second sealing layer 82 ease the stress that occurs in the junction interface between the first sealing layer 81 and the resin collector body 60. Such flexibility can preferably prevent the first sealing layer 81 from peeling off from the resin collector 60, so that it helps to maintain the sealing capability of the sealing part 88 for a longer period of time.

Next, the producing method of the bipolar battery according to the present embodiment is described below.

Figure 2:
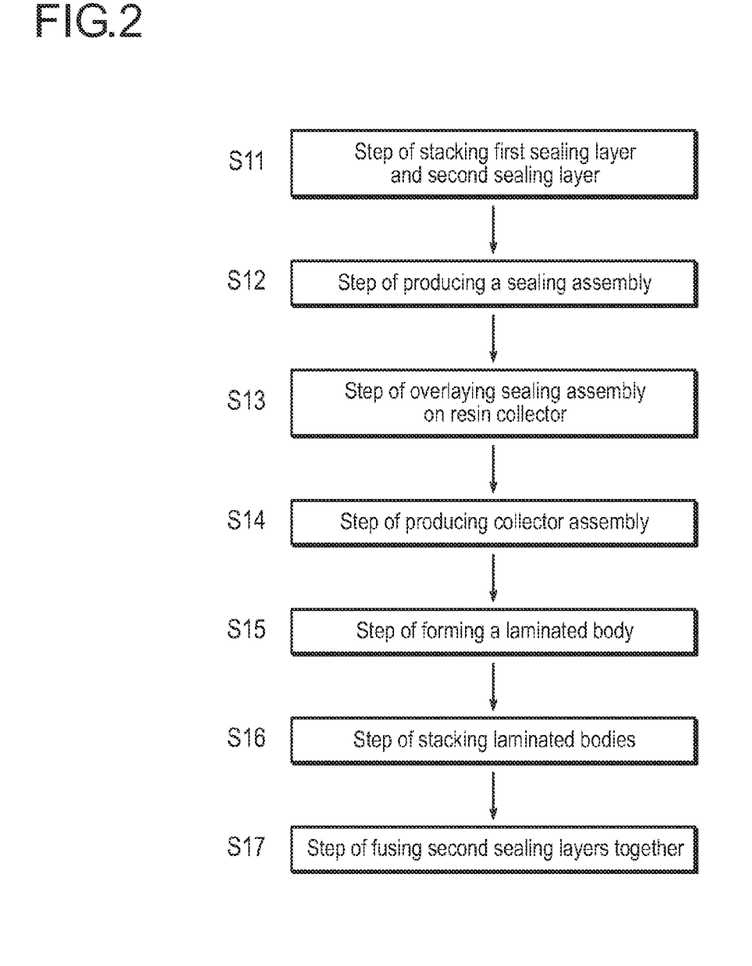
FIG. 2 is an overall step diagram of the producing method of the bipolar battery according to the present embodiment.

With reference to FIG. 2, the method of producing the bipolar battery 10 comprises: a step of stacking the first sealing layer 81 and the second sealing layer 82 (S11); a step of preparing the sealing assembly 80 by adhering the first sealing layer 81 to the second sealing layer 82 (S12); a step of overlaying the sealing assembly 80 on the resin collector 60 (S13); a step of preparing the collector assembly 90 by adhering the sealing assembly 80 to the resin collector 60 (S14): a step of forming a laminated body 40 by stacking the collector assembly 90 on the separators 70 (S15); a step of stacking laminated bodies 40 (S16); and a step of fusing the second sealing layers 82 together (S17).

With reference to FIG. 3A, the first sealing layer 81 consisting of thermosetting resin that is not cured is stacked with the second sealing layer 82 consisting of thermoplastic resin (S11).

With reference to FIG. 3B, the first sealing layer 81 and the second sealing layer 82 are heated by the hot press 100a under the laminated condition (S12).

The heating temperature shall be the temperature that the first sealing layer 81 is cured several percentages. This is to prevent the first sealing layer 81 from being cured excessively. This makes it possible to cause the first sealing layer 81 to be cured sufficiently in the step (S14) of producing the collector assembly 90.

As a result of the heating, the first sealing layer 81 and second sealing layer 82 softens, and the first sealing layer 81 and the second sealing layer 82 make a physically close contact with each other. While they are in the close contact with each other, the second sealing layer 82 is cooled to be solidified. The adhering of the first sealing layer 81 with the second sealing layer 82 completes the making of the sealing assembly 80.

With reference to FIG. 4A, the sealing assembly 80 is overlaid on the resin collector 60 (S13).

The sealing assembly 80 overlaps the peripheral part 63 of the first side 61 of the resin collector 60 as if to surround the positive electrode 65. The first sealing layer 81 of the sealing assembly 80 is placed to face the first side 61 of the resin collector 60. Similarly, the sealing assembly 80 overlaps the peripheral part 63 of the second side 62 of the resin collector 60 as if to surround the negative electrode 67. At this time, the first sealing layer 81 of the sealing assembly 80 is placed to face the second side 62 of the resin collector 60.

As the sealing assembly 80 is produced in advance by adhering the first sealing layer 81 to the second sealing layer 82, the process of overlapping the sealing layers over the resin collector 60 is made simple. Since the handling of the sealing assembly 80 is made simpler, the stacking positioning of the seal can be executed accurately. This improves the sealing capability between the resin collector 60 and the sealing assembly 80.

With reference to FIG. 4B, the sealing assembly 80 is adhered to the resin collector 60 to form the collector assembly 90 (S14).

While the sealing assembly 80 is laid over the resin collector 60, they are heated in the hot press 100b. The first sealing layer 81, which is a polymer material, is thus softened and fused together with the resin collector 60, which is a polymer material. The temperature is raised gradually to promote the first sealing layer 81 to be cured. As the curing reaction proceeds sufficiently, the first sealing layer 81 makes a sold adhesion to the resin collector 60. The collector assembly 90 is thus completed sealing between the sealing assembly 80 and the resin collector 60. Individual sealing assemblies 80 that are adhered to the collector assembly 90 constitute a sealing structure 85 that forms the sealing part 88.

The sealing assembly 80 is heated to complete the adhering as the first side 61 on which the positive electrode 65 is formed and the second side 62 on which the negative electrode 67 is formed are overlaid respectively by the sealing assembly 60. Since the sealing assembly 80 is adhered to the first side 61 of the resin collector 60 and the second side 62 of the resin collector 60 simultaneously, the number of producing steps of the bipolar battery 10 can be reduced and the production efficiency can be improved compared to a case of adhering the sealing assembly 80 to the first side 61 of the resin collector 60 and the second side 62 of the resin collector 60 individually.

Figure 6:
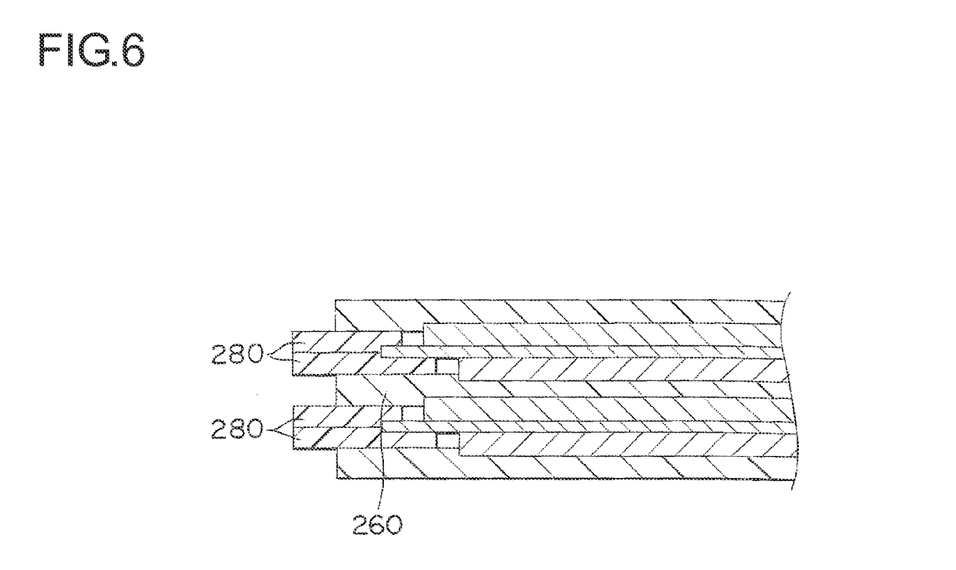
FIG. 6 is a schematic cross-sectional view for describing the sealing structure of a comparison example.

FIG. 6 shows the sealing structure of a comparative example in which a sealing layer 280 consisting of a hot-melt type thermoplastic resin is adhered to a resin collector 260 containing a thermosetting resin that is cured.

The resin collector 260 contains the thermosetting resin that is cured hardened in the producing process. Since the resin collector 260 does not soften when it is heated, the adhering between the sealing layer 280 and the resin collector 260 in a close physical contact state is difficult to occur. Moreover, since there is a big difference in the SP value between the thermosetting resin contained in the resin collector 260 and the sealing layer 280 consisting of the thermoplastic resin, it is difficult for the softened sealing layer 280 to mix with the resin collector 260. Therefore, the adhering force between the sealing layer 280 and the resin collector 260 is extremely weak in the sealing structure of the comparative example where the hot-melt type sealing layer consisting of the thermoplastic resin. Consequently, the sealing capability of the sealing part is low, and it may cause degradation of the cycle characteristics of the bipolar battery due to the leakage and evaporation of the electrolyte.

On the contrary, the present embodiment makes it possible to suitably adhere the sealing assembly 80, which is made by adhering the first sealing layer 81 consisting of a thermosetting resin that is not cured to the second sealing layer 82 consisting of a thermoplastic resin, to the resin collector 60 containing the thermosetting resin that is cured in a adhering mode utilizing the progress of the curing reaction of the first sealing layer 81 of the relevant sealing assembly 80.

Since the thermosetting resin that is not cured is used for the first sealing layer 81 and the thermoplastic resin is used for the second sealing layer 82, it is possible in the step of producing the sealing assembly 80 to adhere the first sealing layer 81 to the second sealing layer 82 while they are in a physically close contact with each other by softening first sealing layer 81 and the second sealing layer 82. Moreover, in the step of producing the sealing assembly 80, the adhering between the first sealing layer 81 and the second sealing layer 82 is executed by heating at a temperature lower than the temperature that the first sealing layer 81 is cured excessively. Consequently, in the step of producing the collector assembly 90, it is possible to adhere the first sealing layer 81 to the resin collector 60 while causing the first sealing layer 81 to be cured sufficiently. Furthermore, since the difference in the SP value is small between the resin collector 60 that contains the thermosetting resin and the first sealing layer 81, it is possible in the process of the first sealing layer 81 to be cured to cause the first sealing layer 81 which is a polymer material to soften sufficiently to fuse with the resin collector 60 made of a polymer material. This makes it possible to produce a solid adhesion between the resin collector 60 and the sealing assembly 80.

With reference to FIG. 5A, the separator 70 is laid over the collector assembly 90 to form the laminated body 40 (S15).

In forming the laminated body 40, it is possible to handle the sealing assembly 80 and the resin collector 60 together as an integrated body, i.e., the collector assembly 90. This makes it possible to simplify the process of producing the bipolar battery compared to a case of preparing the sealing layer and the collector separately and stacking them.

With reference to FIG. 5B, a plurality of the laminated bodies 40 are overlaid on each other with the second sealing layer 82 of the sealing assembly 80 facing with each other.

These multiple overlaid laminated bodies 40 constitute the power generating member 20 of the bipolar battery 10.

Next, the sealing assembly 80 and the resin collector 60 are heated to a temperature higher than the melting point of the second sealing layer 82 to cause the second sealing layers 82 to fuse with each other (S17).

They are sealed like a pouch except a portion of them to form an injection port for injecting the electrolyte. The electrolyte is injected under the sealing condition to cause it to permeate into the positive electrode 65 and the negative electrode 67. The heating for fusing them are provided by the hot press 100c.

The rest of the second sealing layer 82 is fused together after the injection of the electrolyte. The second sealing layers 82 are fused together to seal the contact area of the adjoining sealing assemblies 80. Thus the sealing part 88 is completed. The sealing part 88 functions as a seal to suitably prevent the leakage and evaporation of the electrolyte, or water infiltration from the outside.

With the step described above, the adhering between the resin collector 60 containing the thermosetting resin that is cured and the sealing assembly 80 is done solidly to provide a bipolar battery 10 with an improved sealing characteristic at the sealing part 88.

As described in the above, in the present embodiment, the collector assembly 90 is produced by adhering the sealing assembly 80, which is produced by adhering the first sealing layer 81 consisting of the thermosetting resin that is not cured to the second sealing layer 82 consisting of the thermoplastic resin, to the resin collector 60 containing the thermosetting resin that is cured. In the step of producing the sealing assembly 80, the adhering between the first sealing layer 81 and the second sealing layer 82 is executed by heating at a temperature lower than the temperature that the first sealing layer 81 is cured. As a result, in the step of adhering the resin collector 60 to the sealing assembly 80, the adhering process can be accomplished by causing the first sealing layer 81 to be cured. This makes it possibly to improve the sealing characteristics of the bipolar battery by adhering the resin collector 60 to the sealing assembly 80 solidly, in order to prevent the degradation of the cycling characteristics of the bipolar battery 10.

The collector assembly 90 is produced by adhering the first side 61 of the resin collector 60 with the second side 62 of the resin collector 60. The sealing assembly 80 is adhered to the first side 61 of the resin collector 60 and the second side 62 of the resin collector 60 simultaneously in one heating operating. This contributes to the improvement of the production efficiency through the reduction of the production steps of the bipolar battery 10 compared to a case of adhering the sealing assembly 80 with the first side 61 of the resin collector 60 and the second side 62 of the resin collector 60 independently. In forming the laminated body 40, it is possible to handle the sealing assembly 80 and the resin collector 60 assembled together as a collector assembly 90. This makes it possible to simplify the process of producing the bipolar battery compared to a case of preparing the sealing layer and the collector separately and stacking them.

The adhering between the resin collector 60 containing the thermosetting resin that is cured and the sealing assembly 80 is done solidly to provide a bipolar battery 10 with an improved sealing characteristic at the sealing part 88.

The embodiment described above can be arbitrarily modified. The shapes of the sealing assembly 80 and the location of adhering the sealing assembly 80 is not limited to the one described above, but rather can be modified arbitrarily within the scope of the capability of adhering the first sealing layer to the resin collector by promoting its curing reaction.

Moreover, as shown in the following variant example, the sealing assembly 80 needs to have a least two layers consisting of the first sealing layer 81 and the second sealing layer 82 stacked together, and it can also be formed into a multilayer structure consisting of three or more laminated sealing layers.

Variant Example

Figure 7A:
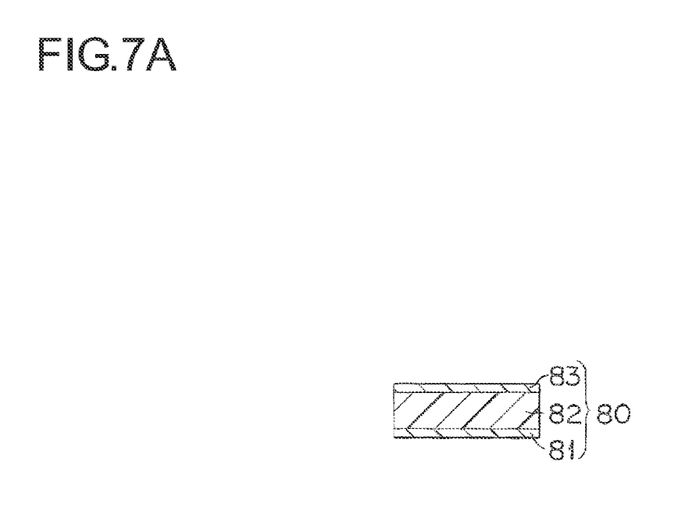
FIG. 7A is a schematic cross-sectional view for describing the method of manufacturing a bipolar battery of a variation example.
Figure 7B:
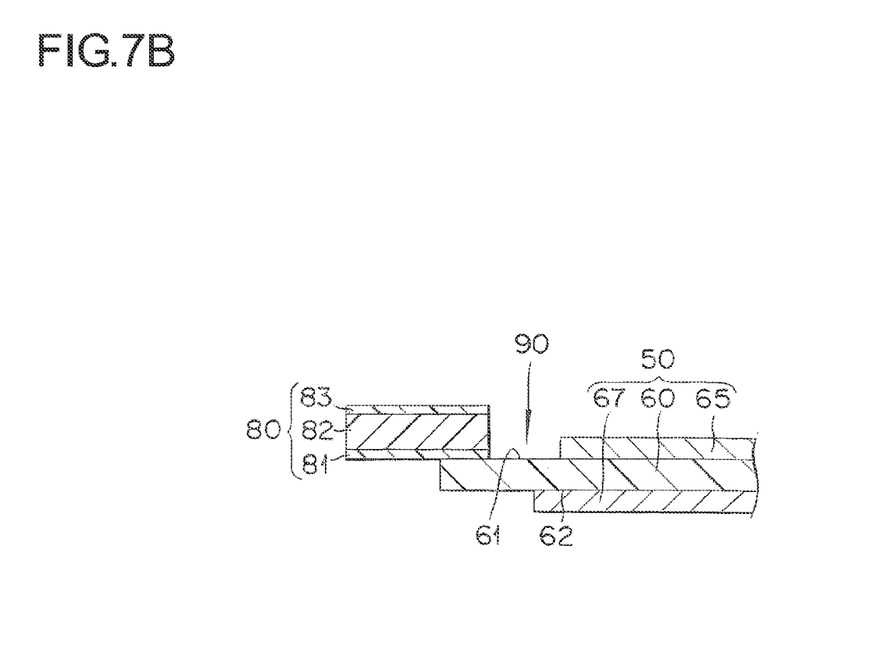
FIG. 7B is a schematic cross-sectional view for describing the method of manufacturing a bipolar battery of a variation example.
Figure 7C:
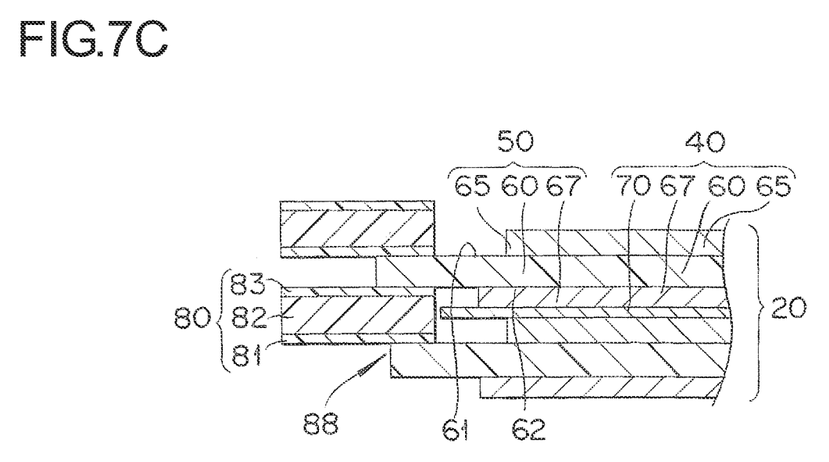
FIG. 7C is a schematic cross-sectional view for describing the method of manufacturing a bipolar battery of a variation example.

FIG. 7A through 7C show the variant example of the embodiment mentioned above. In this variant example, the sealing assembly 80 is formed as a triple layer structure consisting of a first sealing layer 81 consisting of a thermosetting resin (first layer), a second sealing layer 82 consisting of a thermoplastic resin (second layer), and a third sealing layer 83 consisting of a thermosetting resin (third layer). As it is so consisted, it is different from the previous embodiment using the two layer structure sealing assembly 80 consisting of a stacking of the first sealing layer 81 and the second sealing layer 82. The following description partially skips the descriptions of the bodies and the producing steps, if they are identical to those of the embodiment mentioned above.

With reference to FIG. 7A, the sealing assembly 80 is formed by heating the first sealing layer 81, the second sealing layer 82, and the third sealing layer 83 while they are stacked.

The heating condition is set in such a temperature and time that the first sealing layer 81 and the third sealing layer 83 is cured several percentages.

As they are heated while they are stacked, the first sealing layer 81, the second sealing layer 82, and the third sealing layer 83 get softened to make close contacts between the adjoining layers. While they are in the close contact with each other, the second sealing layer 82 is cooled to be solidified. By doing so, the first sealing layer 81 and the third sealing layer 83 are adhered together via the second sealing layer 82.

With reference to FIG. 7B, the triple layer sealing assembly 80 is adhered to the first side 61 of the resin collector 60 to form the collector assembly 90. The sealing assembly 80 seals the contact area of the sealing assembly 80 and the resin collector 60.

With reference to FIG. 7C, the separator 70 is laid over the collector assembly 90 to form the laminated body 40. The power generating element 20 is formed by stacking a plurality of laminated bodies 40.

After the stacking, it is heated by the hot press. The heating condition is set in such a temperature and time that the first sealing layer 81 and the third sealing layer 83 is cured sufficiently.

The sealing is performed by adhering the first sealing layer 81 of the sealing assembly 80 with the resin collector 60. Similarly, the sealing is performed by adhering the third sealing layer 83 of the sealing assembly 80 to another adjoining resin collector 60. The sealing part 88 is formed to prevent the leakage and evaporation of the electrolyte, or water infiltration and such from the outside.

The second sealing layer 82 consisting of thermoplastic resin can expand more easily than the first sealing layer 81 consisting of thermosetting resin that is adhered to the resin collector 60. Similar to the aforementioned embodiment, the peeling of the first sealing layer 81 from the resin collector 60 can be suitably prevented as the second sealing layer 82 deforms flexibly as the resin collector 60 expands and contracts.

According to the present variant example, since the triple layer structure sealing assembly 80 is adhered to one resin collector 60, it can be adhered to another resin collector 60 adjoining the one resin collector 60 via the third sealing layer 83 (third layer) consisting of a thermosetting resin, while the adhering is being completed to the resin collector 60 via the first sealing layer 81 (first layer) consisting of a thermosetting resin. Therefore, it can improve the work efficiency in comparison with an embodiment where the double layer structure sealing assembly is adhered to both the first side 61 and the second side 62 of the resin collector 60 individually.

Also, since the first sealing layer 81 consisting of a thermosetting resin and the third sealing layer 83 consisting of a thermosetting resin are adhered to the resin collector 60 containing a thermosetting resin, the adhering force between the sealing assembly 80 and the resin collector 60 can be improved. As this further improves the sealing characteristics between the resin collectors 60, the degradation of the cycling characteristics can be suitably suppressed.

Embodiment

A preferred embodiment of the bipolar battery using the two layer structure sealing assembly consisting of the first sealing layer and the second sealing layer is described in the following. The bipolar battery according to the present embodiment is produced as follows.

<Preparation of the Resin Collector>

A thermosetting resin material such as polyimide is used as the substrate material. As an electrically conductive aid, acetylene black and the like is added to the substrate material. It is then formed into a thin film by means of the extrusion forming method and completed as a rectangular shape.

<Preparation of the Positive Electrode>

The positive material is produced by mixing the following materials in the specified ratio.

$LiMn_2O_4$ (85 wt %) was used as the positive electrode activating material. Acetylene black (5 wt %) was used as the electrically conductive aid. PVDF (10 wt %) was uses as the binder. NMP was used as the slurry viscosity adjusting solvent to achieve a proper coating viscosity. The abovementioned slurry was coated on one side of the resin collector 60 and dried to complete the positive electrode 65.

<Preparation of the Negative Electrode>

The negative material is produced by mixing the following materials in the specified ratio.

Hard carbon (85 wt %) was used as the positive electrode activating material. Acetylene black (5 wt %) was used as the electrically conductive aid. PVDF (10 wt %) was uses as the binder. NMP was used as the slurry viscosity adjusting solvent to achieve a proper coating viscosity. By coating and drying the above slurry to one side of the resin collector 60, the bipolar battery 50 was completed to have the positive electrode 65 on the first side 61 and the negative electrode 67 on the second side 62 of the resin collector 60, <Preparation of the Electrolyte Material>

The electrolyte material was produced by using polycarbonate and ethylene carbonate mixed in the 1:1 ratio as the electrolyte solution and $1MLiPF_6$ (90 wt %) as the lithium salt.

<Preparation of Sealing Assembly>

Epoxy resin, which is a thermosetting resin that is not cured, is used as the first sealing layer 81. A thermoplastic resin made by mixing polyethylene and polypropylene was used as the second sealing layer 82. The two layer structure sealing assembly 80 was produced by stacking and then heating the first sealing layer 81 and the second sealing layer 82. It was then heated at a temperature of 80° C. and a pressure of 0.2 MPa for 10 seconds.

<Preparation of Collector Assembly>

The sealing assembly 80 was adhered to the resin collector 60, which was produced with the positive electrode 65 and the negative electrode 67, to form the collector assembly 90. The sealing assembly 80 overlaid on the four sides of the periphery of the resin collector 60 was heated to harden the first sealing layer 81 to adhere them. It was then heated at a temperature of 140° C. and a pressure of 1.0 MPa for 15 minutes.

<Preparation of the Sealing Part>

The collector assemblies 60 and the separators 70 are stacked alternately multiple times to prepare the power generating element 20. Heat pressing was applied to the three side of the sealing assembly 80 laid over the resin collector 60. The second sealing layer 82 of the sealing assembly 80 was fused with each other in a pouch form by means of the heat press. The electrolyte was injected through one side that is not sealed.

After that, the remaining side was fused to be sealed by means of the heat press to complete the sealing part 88. The fusion of the second sealing layer 82 was conducted by heating at a temperature of 200° C. and a pressure of 0.2 MPa for one minute.

<Preparation of the Bipolar Battery>

A collector plate 57 with a size of Al was connected to the power generating element formed with the sealing part 88. A pull-out part provided on the power collecting plate 57 was pulled out to the outside of the projection area of the power generating element 20. The power collecting plate 57 was connected to the resin collectors 60a and 60b respectively located on the outermost layers sandwiching the power generating element 20.

The power generating element 20 and the power collecting plate 57 were covered by an aluminum laminate 55 to be vacuum-sealed, and the entire power generating element 20 was made to be pressured by the atmospheric pressure. Thus, the bipolar battery 10 wherein the contact of the power collecting plate 57 against the power generating element 20 was enhanced by the additional pressure was completed.

Next, the evaluation test of the bipolar battery thus produced will be described below.

<Evaluation Test of the Bipolar Battery>

The bipolar battery 10 produced by the above procedure is evaluated in the following method.

It was charged by the constant current method (CC, current: 0.5 C) under the atmosphere of 25° C. until it reached 4.2V, let it rest for 10 minutes, discharged by the constant current method (CC, current: 0.5 C) until it reached 2.5V, and let it rest for 10 minutes. Considering this charging and discharging process as one cycle, 50 cycles of charge/discharge test were conducted.

As a comparison example, a bipolar battery equipped with a sealing structure using a conventional hot-melt type sealing layer made of a thermoplastic resin was prepared. Components other than the sealing layers and the sealing structures are produced in the similar manner as in the present embodiment. The charge/discharge tests same as above were conducted on the comparative example and the results were compared with those of the present embodiment.

The bipolar battery 10 according to the present embodiment showed a capacitance holding rate of over 90% after 50 test cycles. On the contrary, in case of the battery of the comparative example, the discharge holding rate dropped drastically due to the leakage of the electrolyte caused by the peeling of the sealing layer in the initial period of the charge/discharge test. The bipolar type battery 10 according to the present embodiment showed a result that the cycle characteristic improves because of the better sealing characteristics of the sealing part 88 compared to the bipolar battery having the conventional sealing structure.

Although the present invention was described through the embodiments and examples above, the present invention should not be construed to be limited by those embodiments and examples.

The present application is based on the Japanese Patent Application No. 2010-078740 filed on Mar. 30, 2010, the disclosure content thereof is referenced here and made a part of hereof as a whole.

DESCRIPTION OF THE CODES

10 Bipolar battery
20 Power generating element
30 Single electrical cell layer
40 Laminated body
50 Bipolar battery
60 Resin collector
60a, 60b Resin collector located on most outer layer
61 First side (one side)
62 Second side (the other side)
63 Peripheral part
65 Positive electrode (electrode)
67 Negative electrode (electrode)
70 Separator
80 sealing assembly
81 First sealing layer
82 Second sealing layer
83 Third sealing layer
85 Sealing structure
88 Sealing part
90 Collector assembly

The invention claimed is:

1. A method of producing a sealing structure of a bipolar battery comprising:
a step of stacking a first sealing layer consisting of a thermosetting resin that is not cured on a second sealing layer consisting of a thermoplastic resin;
a step of preparing a sealing assembly by heating the first sealing layer and the second sealing layer at a temperature lower than a temperature at which the thermosetting resin of the first sealing layer is cured in order to adhere the first sealing layer to the second sealing layer;
a step of stacking the first sealing layer of the sealing assembly on a same surface that an electrode is formed at a peripheral part of a resin collector comprising a thermosetting resin that is cured; and
a step of preparing a collector assembly, wherein a contact area of the sealing assembly and the resin collector is sealed by heating the sealing assembly and the resin collector at the temperature at which the thermosetting resin of the first sealing layer is cured to adhere the first sealing layer of the sealing assembly to the resin collector.

2. The method of producing the sealing structure of the bipolar battery claimed in claim 1, wherein
the sealing assembly is stacked on a peripheral part of one side of the resin collector where a positive electrode is formed and a peripheral part of the other side of the resin collector where a negative electrode is formed in the step of stacking the first sealing layer on the resin collector; and
the first sealing layer of the sealing assembly is adhered to the one side of the resin collector and the other side of the resin collector in the process of preparing the collector assembly.

3. A process of producing a bipolar battery comprising:
a step of forming a laminated body by stacking a porous separator electrolyte permeate on the collector assembly claimed in claim 2;
a step of stacking a plurality of the laminated bodies in such a manner that second sealing layers face each other; and
a step of fusing the second sealing layers with each other by heating the sealing assembly and the resin collector at a temperature higher than a temperature of the second sealing layer's melting point.

4. A sealing structure of a bipolar battery comprising:
a resin collector containing a thermosetting resin; and
a sealing assembly formed by adhering a first sealing layer consisting of a thermosetting resin to a second sealing layer consisting of a thermoplastic resin, wherein
the first sealing layer of the sealing assembly is adhered to the resin collector and seals a contact area of the sealing assembly and the resin collector.

5. The sealing structure of the bipolar battery claimed in claim 4, wherein
when the first sealing layer of the sealing assembly is adhered to the resin collector, the sealing assembly is stacked on a peripheral part of one side of the resin collector where a positive electrode is formed and a peripheral part of the other side of the resin collector where a negative electrode is formed, and the first sealing layer of the sealing assembly is adhered to the one side of the resin collector and the other side of the resin collector to prepare a collector assembly.

6. A bipolar battery comprising the sealing structure claimed in claim 5, further comprising:

a laminated body formed by stacking a porous separator electrolyte permeate on the resin collector; and a power generating element formed by stacking a plurality of laminated bodies in such a manner that second sealing layers face each other, wherein the second sealing layers are fused and sealed together.

* * * * *